Patented Oct. 8, 1929

1,731,189

UNITED STATES PATENT OFFICE

JOHN G. BERGQUIST, OF NEW YORK, N. Y.

PROCESS FOR THE IMPROVEMENT OF THE MANUFACTURE OF CEMENT FROM SLAG

No Drawing.  Application filed May 18, 1925.  Serial No. 31,217.

My invention consists of an improved process of manufacturing cement from slag. This invention is especially useful in connection with the manufacture of cement from blast furnace slag, but its use is not limited to blast furnace slag.

The main objects of my invention are to dispense with the usual troublesome drying and grinding of the products prior to the calcining operation, to save fuel required for calcining, and especially to secure a more uniform product, under control, and thereby give a superior quality of cement.

In the manufacture of cement in which blast furnace slag is used, it is customary to run the slag into a tank of water to break it up through sudden cooling. This produces a glass-like substance which has to be dried and pulverized. The pulverizing operation is a very difficult one. When ground together with limestone to a fineness necessary for the kiln, a large percentage of this slag is still in the form of coarser grains. This causes segregation, and makes a uniform wet mixture impossible. Furthermore, slag in this condition has a tendency to hydrate and set throughout the operation.

An important feature of my invention consists in taking molten slag as it comes from the blast furnace and treating it, in a suitable furnace, with lime so as to produce a bicalcic silicate, which has the property of disintegrating spontaneously on cooling in the air, thus producing a uniform, impalpable powder, which of course needs no grinding.

In carrying out my invention, I prefer to proceed as follows: the molten slag is taken, preferably in ladles, to a point adjacent to the blast furnaces, where the slag is poured into a second furnace. This latter furnace may be an electric furnace, such as those used for producing calcium carbide, or a reverberatory, gas heated, furnace similar to the open hearth furnace used for making steel, depending upon the local cost of electric power, the availability of by-product gases, etc.

In this second furnace sufficient lime (in the form, for example, of CaO or $CaCO_3$) is added to the molten slag to form with it a bicalcic silicate. As the composition of the blast furnace slag used varies, it will be necessary to determine the quantity of lime to add to each charge. This determination may be made in the following manner:

Chilled samples of slag of various compositions may be accumulated from the furnace so as to cover the range of variation which occurs. A chemical analysis will determine the percentage of lime to be added in each case in order to form a bicalcic silicate, which will spontaneously disintegrate upon cooling. These samples, serially arranged according to composition, may be retained in a rack at the treating furnace, and in connection with each sample there may be provided a written record of the percentage of lime to be added.

Having added the determined amount of lime to the slag, sufficient heat is given the charge in the second furnace to insure a proper viscosity for pouring. In practice it has been found that this requires a temperature rise of about 100° C. above the temperature of the charge immediately after the lime has been added. A very short time is required for the bicalcic silicate to form. This time will depend upon the furnace construction, the fineness of the lime added, etc.

After the bicalcic silicate is formed, the contents of the furnace are poured directly into cooling beds (which may be similar to a pig-casting machine) in order conveniently to get the material away from the furnace. Thence the material can be discharged on to a grating, so that, upon disintegrating after further cooling, it will fall automatically into hoppers, a conveying system, or railway cars under the grating. The material upon thus disintegrating is in the form of an impalpable powder.

Should any granular particles of slag exist in this powdered material, these granules can be removed by air separation or by settlement in water at the cement mill.

This prepared slag, and a proper amount of previously pulverized limestone are thoroughly mixed and ground together wet. Because of the previous treatment of the slag, a minimum of grinding will be required at this point.

From here on, the customary wet process is used, the wet mixture obtained having practically no hydraulic properties.

It may be well to explain that it is not necessary to have pure bicalcic silicate in order to obtain complete disintegration. With a certain percentage of bicalcic silicate there will be a sufficient internal force to cause the automatic breaking up of the slag, even if, in the fused state, the mixture should contain a small percentage of other silicates. The process, therefore, is entirely workable and practical.

It will be obvious that this process is an economical one. The cost of handling the slag through the furnace is offset by dispensing with the cost of the preliminary drying and grinding of the slag; and my process chemically incorporates an additional amount of lime, which will save fuel in the rotary kiln and increase the capacity of the kiln through consequent quicker calcining. Through the production of a more uniform physical and chemical composition, I have made the application of the wet process possible and practicable for making cement from slag.

What I claim is:

1. A process for making cement by the wet process comprising taking molten slag from the furnace in which it is created, pouring it into a second furnace, there adding sufficient lime to form a bicalcic silicate, permitting the product to cool and disintegrate to a powder, mixing with previously pulverized limestone, wetting and grinding the mixture, burning it to a clinker, and grinding the clinker.

2. A process for making cement by the wet process comprising taking slag from the furnace in which it is created, treating it while still in molten form in a second furnace with sufficient lime to form a bicalcic silicate, permitting the product to cool and disintegrate to an impalpable powder, mixing the powder with previously pulverized limestone, wetting and grinding the mixture, and proceeding from that point according to the customary wet process, substantially as described.

In testimony whereof I have signed my name to this specification.

JOHN G. BERGQUIST.